United States Patent Office 3,009,541
Patented Nov. 21, 1961

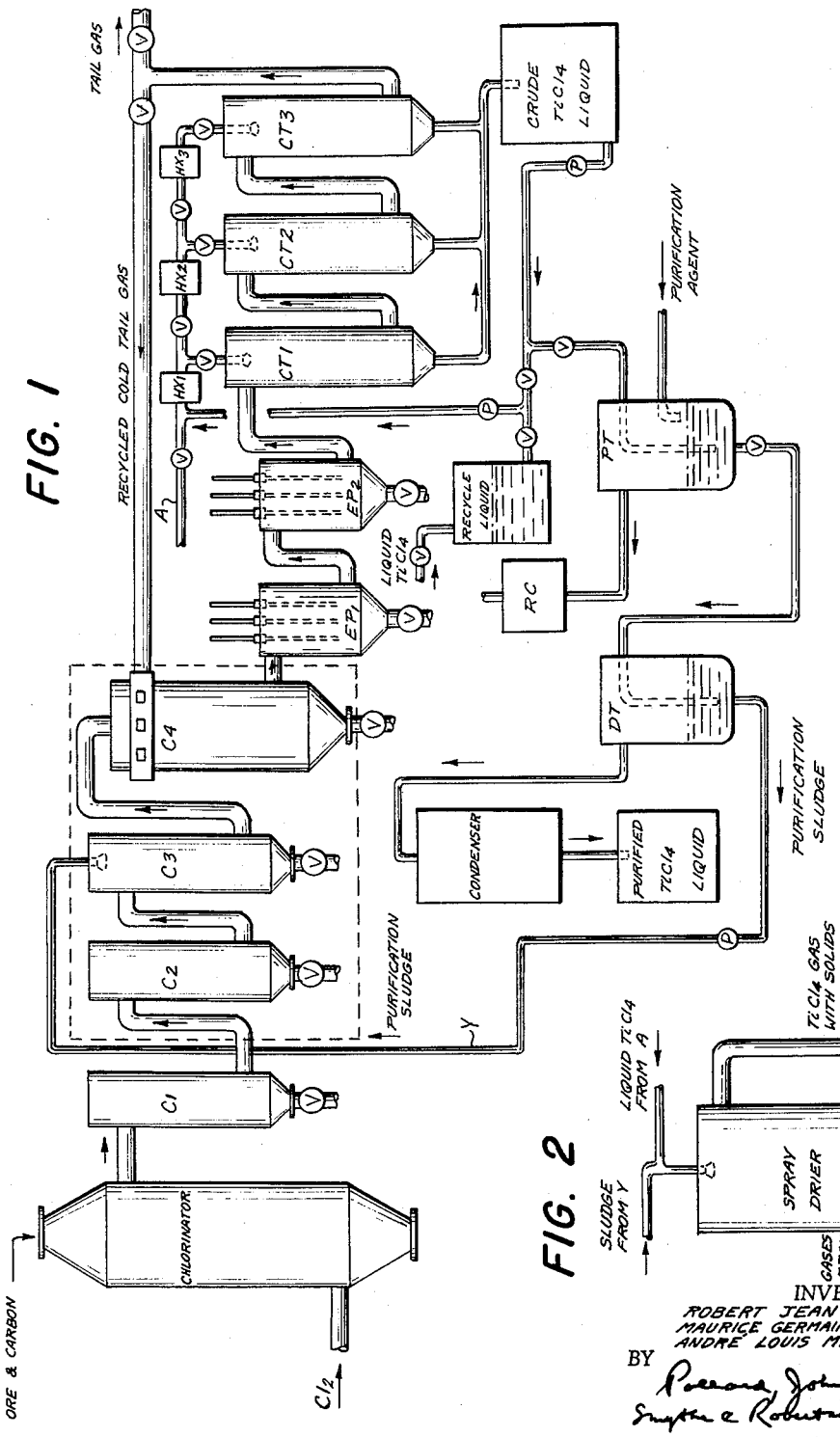

3,009,541
RECOVERY OF TITANIUM TETRACHLORIDE FROM SLUDGES OBTAINED IN THE PURIFICATION OF IMPURE TITANIUM TETRACHLORIDE
Robert Jean Mas, Thann, Haut-Rhin, and Maurice Germain Figuet and André Louis Michaud, Vieux-Thann, Haut-Rhin, France, assignors to Fabriques de Produits Chimiques de Thann et de Mulhouse, Thann, Haut-Rhin, France, a corporation of France
Filed Mar. 19, 1959, Ser. No. 800,466
7 Claims. (Cl. 183—120)

This invention relates to the recovery of titanium tetrachloride from sludges obtained in the purification of impure titanium tetrachloride.

Titanium tetrachloride is generally produced by reacting at high temperature a titanium bearing material such as ilmenite, rutile, or titanium containing slags or like titaniferous materials with chlorine and a reducing agent, usually carbon. Under such reaction conditions one obtains hot gases usually referred to as chlorination gases, from which the titanium tetrachloride is separated after cooling these gases. The cooling is frequently obtained by introducing a certain amount of liquid titanium tetrachloride into the stream of hot gases, in a finely divided, or atomized condition, whereby the temperature of the hot gases is lowered due to the latent heat required to vaporize the liquid titanium tetrachloride. In addition to the desired titanium tetrachloride such processes normally produce varying amounts of by-products which contaminate the obtained desired product. These impurities may be solid particles entrained in the gases as they flow out of the chlorination reactor or gaseous chlorides of other elements present in the reactants, such as iron, manganese, chromium, vanadium, zirconium, aluminum, niobium, silicon and tungsten, etc. While most of these impurities may be removed mechanically or by distillation certain of them, and more particularly vanadium oxychloride, can only be separated economically by distillation after a proper chemical purification step for their boiling points are too close to the boiling point of titanium tetrachloride.

Numerous chemical purification methods have been described for purifying titanium tetrachloride and they mostly comprise heating of the titanium tetrachloride to be purified with varying amounts of "purification agents," followed by a distillation to separate the purified titanium tetrachloride from the excess of purification agents, its products of interaction with the impurities, and possibly its decomposition products. Various purification agents have been suggested heretofore and the following are illustrative thereof namely: mineral absorbing agents; elemental sulphur, hydrogen sulfide and other reactive sulphur compounds; various organic compounds and particularly oils of mineral, animal and vegetable origin or soaps; metals either alone or in combination with alkaline agents; metal hydrides; etc. Regardless of the purifying agents used, one observes as a result of the final distillation, a residue known as a "purification sludge," containing an excess of purification agents, their decomposition products, if any, as well as their products of interaction with the impurities to be removed. The residue containing its suspension of solids is called a "purification sludge" largely due to its consistency.

While it is possible to continue the distillation of the titanium tetrachloride after treatment with the purification agents until a dry solid residue is obtained, this is not done in practice for several reasons. First, it would be difficult to remove such a solid residue from the still. Second, during the final distillation to dryness one observes a partial thermo-cracking of the residue which results, at least in some cases, in a partial release of vanadium and carbon compounds (especially where oil purification agents are used) thereby contaminating the titanium tetrachloride purified by the distillation step. For the foregoing reason, among others, it is now the common practice to remove the distillation residue still in the form of suspension in a part of the treated titanium tetrachloride, i.e. in the form of purification sludge, for discharge or subsequent treatment. Generally speaking however, the recovery of the titanium tetrachloride contained in these purification sludges is necessary for economic reasons. Moreover, it is necessary to eliminate the titanium tetrachloride content of these sludges in order to render possible the dumping of the remainder of the residue and eventually the recovery of any chemical values they may contain. In order to achieve these objectives, the sludges have heretofore been conveyed to rotary dryers in which their titanium tetrachloride content was distilled off leaving the residue in a solid form. This procedure has a number of disadvantages for, among other things, these dryers require significant amounts of heat and power and also need frequent overhauling, and are not easy to operate.

It is an important object of this invention to recover the titanium tetrachloride content of the purification sludge without the disadvantages inherent in prior art procedures. It is a particular object of the invention to recover the titanium tetrachloride contained in purification sludge by converting both the titanium tetrachloride content of the sludge and the residue thereof into physical forms which makes their separation relatively simple and efficient. It is a special object of the invention to recover the titanium tetrachloride content of purification sludge together with the titanium tetrachloride content of chlorination gases substantially without additional expense while obtaining a titanium tetrachloride of substantially the same purity as obtained by discarding the titanium tetrachloride purification sludges. Other features and objectives of the invention will become apparent from the more detailed description which follows.

The above and further objects will appear more fully from the following description when the same is read in connection with the accompanying drawings wherein:

FIGURE 1 is a diagrammatic flow diagram of one embodiment of the invention;

FIGURE 2 is a flow diagram of a second embodiment in which a spray drier is substituted for the dotted outline of FIGURE 1.

Generally speaking, the new method comprises contacting the purification sludges with a stream of hot chlorination gases in such a manner that their titanium tetrachloride content is evaporated while the contained solids remain in a dry solid form and thereafter separating the solids and recovering the vaporized titanium tetrachloride in known ways. More particularly, the new method comprises dispersing the purification sludges in small droplets within a stream of chlorination gases obtained by the chlorination of titaniferous materials so that their titanium tetrachloride content is evaporated whereas their solids content remains as a suspension of dry particles within the stream of chlorination gases whose temperature has been lowered due to the latent heat requirements of the titanium tetrachloride evaporated from the sludge. Thereafter at least a major proportion of the suspended solid particles are separated from the titanium tetrachloride containing gases by any well known means such as settling in settling chambers, separation in cyclone separators, separation in electrostatic separators or filters or the like. Titanium tetrachloride thus evaporated from the purification sludges joins the bulk of the titanium tetrachloride vapors coming from the chlorinator and, as will be evident to those skilled in the art, it will be recovered in practically 100% yield during the titanium tetrachloride condensation step in the titanium tetrachloride producing and recovery system.

Customarily the amount of purification sludges to be treated is relatively small and when atomized in the stream of chlorination gases it only causes a moderate cooling of these gases. For this reason further cooling of the chlorination gases must be provided. This additional cooling may be achieved either by indirect cooling methods, use being made of tubular heat exchange units, or by direct contact cooling methods such as described in U.S. Patent 2,792,077. Alternatively, further cooling may be obtained by causing liquid titanium tetrachloride to be evaporated in the stream of chlorination gases in a quantity such that the normally solid constituents thereof are substantially condensed to the solid state so as to permit their mechanical separation as described, for instance, in U.S. Patent 2,446,181. As stated in this latter patent, the liquid titanium tetrachloride used for cooling may contain some impurities. Obviously, the liquid titanium tetrachloride used for cooling may be used in a separate step or in a single step conjointly with the purfiication sludge. The amount of titanium tetrachloride to be atomized into the chlorination gases in addition to that contained in the purification sludge will depend upon its temperature and the final temperature one wishes to obtain by its cooling effect.

Various means may be used for finely dispersing the purification sludges in the chlorination gases. For example, the dispersion of the purification sludges can be obtained by impinging a stream thereof on a rapidly rotating disc located in a chamber through which the chlorination gases are caused to pass. Another suitable dispersion method makes use of pressure spray nozzles which discharge a fine spray of the sludges into a chamber, or into a tuyère, through which the chlorination gases are caused to pass.

In the practice of this invention care should be taken to avoid a too high percent of solids in the sludges to be treated in order to avoid a lack of fluidity. The allowable solids contents of the sludge will depend on the particular purification process used, but, generally speaking, the solids content should be less than 30% and preferably less than 15%. Certain types of purification sludges are particularly bulky, as for example, purification sludges obtained when using an oil as a purification agent. The sludges obtained when using oil as a purification agent will advantageously be homogenized by turbine mixers, or by any other proper device, before being fed to the atomization equipment. It is apparent that any coarse and hard particles that may be present in the sludges should be removed before they are atomized in order to avoid damaging the atomization equipment. The sludges of the type discussed hereinbefore normally do not contain such coarse hard particles.

After the introduction of the purification sludges into the chlorination gases and their titanium tetrachloride content has been vaporized, it will be apparent that the resulting chlorination gases may be further treated by techniques well known in the art or by any combination of such techniques in order to recover the titanium tetrachloride content of these gases. These titanium tetrachloride recovery processes, as such, do not constitute a novel element of this invention.

The practice of this invention has resulted in a number of unexpected and unobvious achievements. For example, it has been stated above that the evaporation of the titanium tetrachloride sludges to dryness in a still has resulted in the contamination of the recovered titanium tetrachloride vapors such as with carbon and vanadium compounds. Yet, in the process of this invention, the recovered purified titanium tetrachloride does not seem to be impurified to any significant or objectionable extent, even when the sludges are vaporized in very hot chlorination gases of say 700° C. This observation even holds true for the type of purification sludges obtained by treatment of the impure titanium tetrachloride liquids with organic purification agents such as shown in Patent 2,230,538 wherein the vanadium compounds are known to be rather weakly bonded to the purifying agents. This leads to the apparently very unexpected conclusion that impurifying vanadium compounds are not volatilized to an objectionable extent in these hot chlorination gases.

It is known that in a continuously operating titanium tetrachloride producing unit, the vanadium content of the crude titanium tetrachloride obtained from the chlorination gases is rapidly stabilized at a fixed level depending on the analysis of the carbon and ore fed to the chlorinator. It has been found that the introduction of purification sludges into the hot chlorination gases obtained from titaniferous material, once the vanadium content of the crude gases has been stabilized, does not significantly vary the vanadium content of such gases. This discovery would seem to confirm the observation that substantially the entire vanadium content of the sludges is eliminated with the solid particles formed upon the vaporization of the titanium tetrachloride contained in the sludges.

Also, one might expect some thermal cracking in the vaporization of the titanium tetrachloride content of the purification sludges obtained by treating impure titanium tetrachloride with purification agents such as oil or soap. If such an expectation were to be confirmed, the resulting chlorination gases would contain increased quantities of carbon. Yet unexpectedly, the introduction of such purification sludges into hot chlorination gases does not significantly increase the carbon content of the purified titanium tetrachloride obtained by standard purification of the crude titanium tetrachloride recovered from the resulting gases. It is important that the purified titanium tetrachloride not contain an increased carbon content for it is known that the presence of carbon is particularly disadvantageous in the manufacture of titanium metal.

The significance and the manner of practicing this invention will be further exemplified by the following illustrative examples.

*Example 1*

One manner of practicing the invention will be apparent from FIG. 1 of the attached drawing showing a diagrammatic flow sheet.

In the initial operation of the titanium tetrachloride recovery system the sludge was merely accumulated and its titanium tetrachloride content was not recovered. In a particular instance, the chlorination gases obtained from the chlorination of a rutile ore having a temperature of 970° C. at the chlorinator exit and containing a yield of 950 kg. of titanium tetrachloride per hour was passed through a series of cooling chambers, diagrammatically represented at C1, C2, and C3, and thereby reduced to 550° C. (by natural cooling). Further cooling was obtained by recycling a part of the cold tail gas thereby condensing solids in the chlorination gases. The solids so condensed were removed by two electrostatic precipitators, EP1 and EP2, and the remaining gases were led to a series of cooling towers, represented for illustrative purposes as CT1, CT2, and CT3, where condensation of the contained titanium tetrachloride was obtained by contacting the partially purified gases with cold liquid titanium tetrachloride. It will be apparent that this cold liquid titanium tetrachloride may be obtained from any desired source but, as shown, it is obtained from the crude titanium tetrachloride collected from cooling towers CT1, CT2 and CT3 or from a recycle from the liquid titanium tetrachloride storage tank which, in turn, is supplied from the system or from an outside source. Also, as shown, the liquid titanium tetrachloride recycle conduit is supplied with heat exchangers, HX1, HX2 and HX3, which may be used to further cool the recycled liquid titanium tetrachloride or, if desirable, to supply liquid titanium tetrachlorides to the respective cooling towers at different temperatures.

The crude titanium tetrachloride was recovered at the rate of 950 kg. per hour and contained 0.21% of vanadium oxychloride ($VOCl_3$). The system was operated until desired quantities of crude titanium tetrachloride was recovered from the cooling towers, CT.

When 950 kg. of this crude titanium tetrachloride was treated at 135° C. with 0.3% of mineral oil to cause interaction with its vanadium content in purification tank PT and the treated liquid titanium tetrachloride subjected to distillation in distillation tower DT to recover purified titanium tetrachloride liquid, a "purification sludge" of 100 kg. was obtained containing approximately 93% titanium tetrachloride. The purified titanium tetrachloride obtained from the distillation in DT contained 6 p.p.m. of vanadium oxychloride and 45 p.p.m. of carbon. Thus, it will be seen that such a system permits the recovery per hour of approximately 877 kg of purified titanium tetrachloride and provides a by-product of 100 kg. of highly impure sludge containing 93 kg. of titanium tetrachloride.

After operating the titanium tetrachloride recovery system for some time in the manner indicated above, a spray nozzle was fitted into the upper end of the cooling chambers, C3 for example, and the purification sludge (100 kg. per hour) was cycled thereto and atomized into the chamber to thereby intimately contact the hot chlorination gases. As a result of this introduction of the sludge into the system the hot gases were cooled by 50° C. and the chlorination gases flowed out of cooling chamber C3 at a temperature of 500° C. rather than at the 550° C. exit temperature prevailing when no sludge was recycled. Under similar feed conditions to the chlorinator and with a recycling of the sludge, the system produced approximately 1040 kg. of crude titanium tetrachloride containing 0.24% vanadium oxychloride.

Thus it will be seen that approximately 90 kg. of the approximately 93 kg. of titanium tetrachloride in the purification sludge is recovered. More remarkably still, the purified titanium tetrachloride recovered from the distillation tower, DT, contained 5 p.p.m. of vanadium oxychloride and 50 p.p.m. of carbon. Hence, substantially all of the produced titanium tetrachloride is recovered as a highly purified product without placing an added burden on the system and without adversely affecting the purity of recovered titanium tetrachloride.

*Example 2*

The chlorination unit in Example 1 was modified by incorporating in the hot chlorination gas circuit a spray chamber of the type generally known as a "spray drier" or "atomizer drier." Simultaneously the recycle stream of tail gas was suppressed and the number of cooling chambers reduced to two. This was achieved by retaining one cooling chamber, such as at C1, and by replacing the cooling chambers in the dotted outline of FIG. 1 with the spray drier shown in FIG. 2 and by closing the valve in the recycled cold tail gas conduit. In this way, the temperature of the chlorination gases entering the spray drier was 660° C. In the spray drier the gases were cooled down to 180° C. by dispersing therein about 1430 kg. per hour of crude titanium tetrachloride as it came from the condensation towers, CT, mentioned in Example 1. These cooled gases were sent to the electrostatic separators, EP, which collected the major amount of condenser solids (essentially $FeCl_3$) and then to the condensating towers CT. A part of the condensed crude liquid titanium tetrachloride was sent to the spray drier through conduit A and the remainder (about 950 kg. per hour) was purified in the manner described in Example 1. The recovered purified titanium tetrachloride contained 5 p.p.m. of vanadium oxychloride and 41 p.p.m. of carbon and approximately 100 kg. per hour of purification sludges were accumulated.

When the purification sludges of this example were sent to the spray drier in replacement of the same amount of crude titanium tetrachloride, i.e. admixed with 1350 kg. per hour of crude titanium tetrachloride, the final purification as described in Example 1 produced a titanium tetrachloride containing 7 p.p.m. vanadium oxychloride and 35 p.p.m. of carbon.

Thus it will be seen in this example, also, that no significant impurification of the recovered and purified titanium tetrachloride is caused by recycling the purification sludges and yet substantially the total titanium tetrachloride production of the chlorinator is recovered by recycling the sludges. It is true that additional solids must be separated when recycling the sludges but this burden if offset by the cooling of the hot gases induced by the vaporization of the titanium tetrachloride content of the sludges.

The vanadium oxychloride content of the titanium tetrachloride collected from the condensation towers, CT, was 0.25 in both instances described in the example above.

*Example 3*

The equipment used was the same as that used in Example 2.

The oil used as a purification agent in Examples 1 and 2 was replaced by a purification method using a mixture of finely powdered antimony sulfide and sodium stearate. The purification was obtained by refluxing the crude titanium tetrachloride with 0.15% sodium stearate and 0.15% of antimony sulfide for a period of 2½ hours and then distilling the titanium tetrachloride treated with the purification agents to obtain the purified tiranium tetrachloride.

The treatment of 1000 kg. of titanium tetrachloride by this method produced as a by-product 100–110 kg. of purification sludges. When these sludges were not introduced into the recovery system the purified titanium tetrachloride recovered contained 8 p.p.m. of vanadium oxychloride and 47 p.p.m. of carbon. When these purification sludges were introduced into the spray drier, the purified titanium tetrachloride recovered contained 9 p.p.m. of vanadium oxychloride and 40 p.p.m. of carbon. Here, again, substantially all of the titanium tetrachloride contained in the purification sludges was recovered in the condensation towers without substantially impurifying the purified titanium tetrachloride ultimately recovered and without placing any significant burden upon the titanium tetrachloride recovery system.

While the foregoing specifications sets forth numerous details and several examples to illustrate the practice of this invention, it will be understood that these details may be varied widely and that additional examples can be evolved without departing from the scope or spirit of the invention which is intended to be defined by the appended claims.

What is claimed is:

1. In a process of obtaining purified titanium tetrachloride from metal chloride containing gases produced by the chlorination of titaniferous material, wherein a sludge containing impure liquid $TiCl_4$ and solids is formed as a residue of the removal of the purified $TiCl_4$ from liquid $TiCl_4$ that has been treated with a purification agent after having been condensed from such gases, the steps which comprise intimately contacting said sludge in a finely divided form with a hot stream of said gases in a stage of the path of said stream wherein the temperature of the gases is sufficient to vaporize the $TiCl_4$ content of the sludge and to convert the solids content of the sludge into finely divided dry solids, in a further stage of said path separating the solids in a dry condition from the gases, and then recovering the $TiCl_4$ contained in the gases.

2. A process as claimed in claim 1, said chlorination gases being cooled in the stage wherein they are contacted with said sludge to a temperature not exceeding about 500° C. and not lower than about 180° C.

3. In a process of obtaining purified titanium tetrachloride from metal chloride containing gases produced by the chlorination of titaniferous material, wherein a sludge containing impure liquid TiCl₄ and solids is formed as a residue of the removal of the purified TiCl₄ from liquid TiCl₄ that has been treated with a purification agent after having been condensed from such gases, the steps which comprise dispersing said sludge in the form of finely divided droplets into a hot stream of said gases in a stage of the path of said stream wherein the temperature of the gases is sufficient to vaporize the TiCl₄ content of the droplets and to convert their solids content into dry solids suspended in said stream, in a further stage of said path electrostatically separating the suspended solids in dry condition from the gases, and then condensing the TiCl₄ contained in the gases.

4. In a process of obtaining purified titanium tetrachloride from metal chloride containing gases produced by the chlorination of titaniferous material, wherein a sludge containing impure liquid TiCl₄ and solids is formed as a residue of the removal of the purified TiCl₄ from liquid TiCl₄ that has been treated with a purification agent after having been condensed from such gases, the steps which comprise impinging said sludge against a rotating disc to subdivide the sludge into fine droplets and directing the droplets into a hot stream of said gases in a stage of the path of said stream wherein the temperature of the gases is sufficient to vaporize the TiCl₄ content of the droplets and to convert their solids content into dry solids suspended in said stream, in a further stage of said path separating the suspended solids in dry condition from the gases, and then condensing the TiCl₄ contained in the gases.

5. A process for the recovery and purification of titanium tetrachloride produced by the chlorination of titaniferous material, which comprises cooling the hot gaseous products of such chlorination in a plurality of successive stages of successively lower temperature to a temperature at which their TiCl₄ content remains in a gaseous state yet normally solid chlorides contained in them are condensed to a solid form, in one of said stages dispersing the sludge hereinafter mentioned, in the form of finely divided droplets, into said products to vaporize the TiCl₄ content of said droplets and suspend their solids content in a dry condition within said products, after said cooling stages separating suspended solids in a dry condition from said products, then condensing and separating the TiCl₄ content of said products in an impure liquid form, treating at least part of the impure liquid TiCl₄ with a purification agent to form a suspension of solid impurities in the TiCl₄, distilling TiCl₄ from said suspension to obtain purified liquid TiCl₄ and a residual sludge containing liquid TiCl₄ and said solid impurities, and passing said sludge to said one cooling stage for dispersion into a continuing flow of said hot gaseous products as aforesaid.

6. A process as claimed in claim 5, and dispersing a major proportion of said impure liquid TiCl₄ along with said sludge into said products in said one cooling stage to effect most of said cooling of said hot gaseous products in said one stage.

7. A process as described in claim 5, and dispersing into said products in said one cooling stage, in addition to said sludge, a quantity of said impure liquid TiCl₄ sufficiently to cool said products in said one stage, by the evaporation of liquid TiCl₄ therein, to a temperature of approximately 180° C.

References Cited in the file of this patent
UNITED STATES PATENTS

| | | |
|---|---|---|
| 2,792,077 | Mas et al. | May 14, 1957 |
| 2,849,083 | Nelson et al. | Aug. 26, 1958 |